United States Patent
Huang et al.

(10) Patent No.: US 10,345,868 B2
(45) Date of Patent: Jul. 9, 2019

(54) HINGE STRUCTURE AND PORTABLE ELECTRONIC DEVICE

(71) Applicant: Acer Incorporated, New Taipei (TW)

(72) Inventors: Yu-Chin Huang, New Taipei (TW); Yu-Nan Lin, New Taipei (TW); Wen-Neng Liao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/680,222

(22) Filed: Aug. 18, 2017

(65) Prior Publication Data

US 2018/0284847 A1 Oct. 4, 2018

(30) Foreign Application Priority Data

Mar. 31, 2017 (TW) .............................. 106111090 A

(51) Int. Cl.
| | |
|---|---|
| H05K 5/00 | (2006.01) |
| G06F 1/16 | (2006.01) |
| F16C 11/04 | (2006.01) |
| E05D 11/08 | (2006.01) |

(52) U.S. Cl.
CPC ............ *G06F 1/1681* (2013.01); *F16C 11/04* (2013.01); *E05D 11/081* (2013.01); *E05Y 2201/46* (2013.01); *E05Y 2201/474* (2013.01); *E05Y 2900/606* (2013.01)

(58) Field of Classification Search
CPC ........................................................ G06F 1/16
See application file for complete search history.

(56) References Cited

U.S. PATENT DOCUMENTS

2017/0308130 A1* 10/2017 Hsu ........................ G06F 1/1616

FOREIGN PATENT DOCUMENTS

| CN | 102088829 | 6/2011 |
|---|---|---|
| JP | 2013231284 | 11/2013 |
| TW | M252204 | 12/2004 |
| TW | I563183 | 12/2016 |

* cited by examiner

*Primary Examiner* — Jerry Wu
(74) *Attorney, Agent, or Firm* — JCIPRNET

(57) ABSTRACT

A hinge structure including an axis body, a torque member, and a pressing assembly is provided. The axis body includes a contact surface. The torque member leans against the contact surface of the axis body. The torque member and the axis body are rotatable relatively around a central axis of the axis body. The contact surface pushes the torque member to move around the central axis of the axis body when the torque member and the axis body rotate relatively. The pressing assembly provides a pushing force to the torque member to push the torque member to push towards the contact surface. A plurality of electronic devices having the hinge structure are further provided.

6 Claims, 4 Drawing Sheets

HINGE STRUCTURE AND PORTABLE ELECTRONIC DEVICE

CROSS-REFERENCE TO RELATED APPLICATION

This application claims the priority benefit of Taiwan application serial no. 106111090, filed on Mar. 31, 2017. The entirety of the above-mentioned patent application is hereby incorporated by reference herein and made a part of this specification.

BACKGROUND OF THE INVENTION

1. Field of the Invention

The invention relates to a hinge structure and a portable electronic device. More particularly, the invention relates to a hinge structure in which torque force and rotation angle may be adjusted easily and a portable electronic device having the hinge structure.

2. Description of Related Art

In recent years, as the technology industry develops, portable electronic devices, such as notebooks (NBs) and tablet PCs, have become common in daily life. As types and functions of the portable electronic devices become more and more diverse, the portable electronic devices thus experience increasing popularity thanks to enhanced convenience and usability. Moreover, the portable electronic devices may be used for different purposes according to users' needs. For example, in the case of a notebook, a notebook usually has two bodies, and the two bodies are connected to each other through a hinge structure. Moreover, the two bodies are rotatable relatively through the hinge structure, and that the notebook can be closed or opened. Some of the tablet PCs are equipped with holders. A holder and a tablet PC may be pivoted to each other through the hinge structure as well, such that the holder and the tablet PC are rotatable relatively and are maintained at an appropriate angle, and that the holder is able to support the tablet PC.

Nevertheless, a conventional hinge structure takes up a certain volume in the machine body of the portable electronic device owing to limits of structural design. Especially, portable electronic devices of relatively large model are usually heavier, a greater torque value (torque damping value) thus has to be correspondingly provided by the hinge structure, and that the volume of the hinge structure is further increased, which is disadvantageous for portable electronic devices in the development of portability and miniaturization.

SUMMARY OF THE INVENTION

The invention provides a hinge structure suitable for a portable electronic device, and the hinge structure features relatively simple structure or relatively small volume.

The invention further provides another hinge structure suitable for a portable electronic device, in which a torque value of the hinge structure may be changed conveniently by a designer, and the same or similar volume of the hinge structure is maintained when the torque value is changed, such that burdens for designing internal layout of the device or case mold are reduced.

In an embodiment of the invention, a hinge structure includes an axis body, a torque member, and a pressing assembly. The axis body includes a contact surface. The torque member leans against the contact surface of the axis body. The torque member and the axis body are relatively rotatable around a central axis of the axis body, and the torque member is pushed by the contact surface to move around the central axis of the axis body when the torque member and the axis body rotate relatively. A pushing force is provided by the pressing assembly to the torque member to push the torque member to push towards the contact surface.

In an embodiment of the invention, the axis body has an external thread, the torque member has a first internal thread, the torque member is threaded to the axis body, and the contact surface of the axis body is located on the external thread.

In an embodiment of the invention, the external thread is located on one end portion of the axis body, and the torque member is located between the pressing assembly and the axis body.

In an embodiment of the invention, the contact surface is located at an end of the axis body. The contact surface is an eccentric concave surface, an eccentric convex surface, an irregular curved surface, a bevel, or a spiral end surface. A contour of an end surface of a torque member is shaped to be fitted into a contour of the contact surface of the axis body. The end surface of the torque member is in contact with the contact surface of the axis body.

In an embodiment of the invention, the pressing assembly is an elastic member and is in contact with the torque member to provide the pushing force.

In an embodiment of the invention, the pressing assembly includes two magnetic members, the two magnetic members are repulsive with each other, and one of the magnetic members leans against the torque member to provide the pushing force.

In an embodiment of the invention, the torque member and the pressing assembly are both magnetic, and the torque member and the pressing assembly are repulsive with each other.

In an embodiment of the invention, a portable electronic device includes the hinge structure as described above and further includes a first housing and a second housing. The first housing includes a containing groove recessed on a surface, and the torque member and the pressing assembly are located in the containing groove. The first housing leans against an outer contour of the torque member to disable the torque member from being rotatable around the central axis of the axis body relative to the first housing. The axis body is secured to the second housing.

In an embodiment of the invention, a portable electronic device includes the hinge structure as described above and further includes a first housing, a cover body, and a second housing. The first housing includes a containing groove recessed on a surface, and the torque member and the pressing assembly are located in the containing groove. The cover body is secured to the first housing and is located in the containing groove. The cover body leans against the outer contour of the torque member to disable the torque member from being rotatable around the central axis of the axis body relative to the cover body. The axis body is secured to the second housing.

In an embodiment of the invention, a cross section of the torque member transverse to the central axis of the axis body is a non-circular cross section.

In view of the foregoing, in the portable electronic device provided by the embodiments of the invention, the inner contour of the containing groove of the first housing is shaped to be fitted into the outer contour of the torque member of the hinge structure; alternatively, the inner contour of the cover body secured to the first housing is shaped to be fitted into the outer contour of the torque member of the hinge structure, such that the torque member in the containing groove is disabled from being rotatable relative to the first housing. Therefore, the hinge structure is secured to the first housing with no screws, and less space in the first housing is thus allocated to accommodate the hinge structure. In addition, in the hinge structure provided by the embodiments of the invention, the torque member is designed to leans against the contact surface of the axis body and to be located between the axis body and the pressing assembly, such that the torque member is pushed by the contact surface when the axis body rotates and moved towards the direction of the pressing assembly, and a pushing force (possibly be a reaction force, a magnetic force, or an elastic force) is correspondingly provided by the pressing assembly to the torque member, the contact surface of the axis body is thus pushed by the torque member. As the torque value provided by the hinge structure is related to friction between the torque member and the contact surface of the axis body, friction (friction is the product of friction coefficient and normal force) between the torque member and the contact surface of the axis body may be changed through adjusting the size, the degree of magnetic force, the elastic coefficient, etc. of the pressing assembly, and usage effect delivering easy design and easy change of setting parameters is thus provided.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
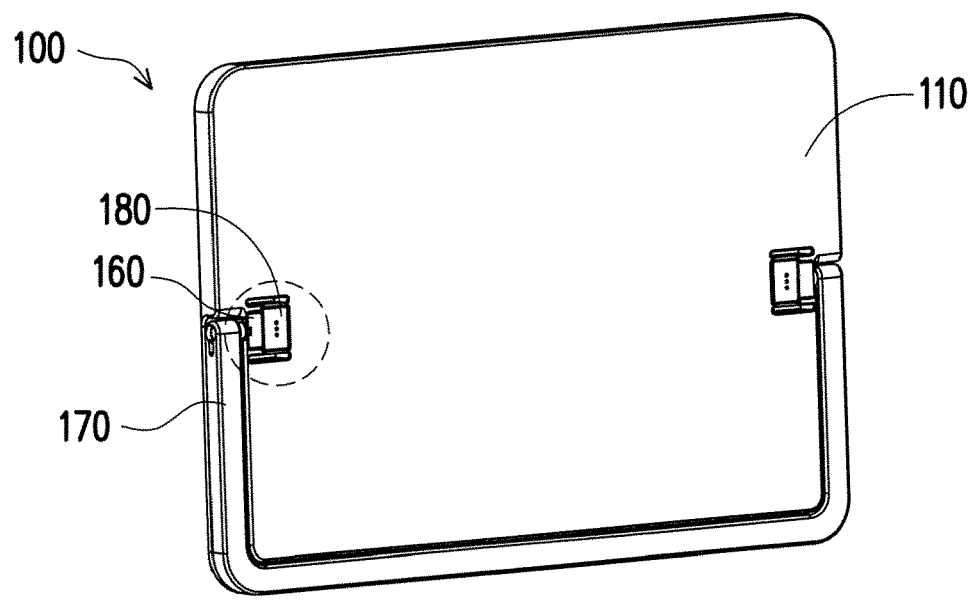
FIG. 1 is a schematic view of a portable electronic device according to an embodiment of the invention.

FIG. 1 is a schematic view of a portable electronic device according to an embodiment of the invention. Referring to FIG. 1, a portable electronic device 100 provided by the embodiment is exemplified as a tablet PC. The portable electronic device 100 includes a first housing 110, a hinge structure 120 (shown in FIG. 2), a cover body 160, a second housing 170, and a shell body 180. The cover body 160 and the shell body 180 are respectively secured to the first housing 110. The second housing 170 may be rotatable relative to the first housing 110 through the hinge structure 120. In the embodiment, the first housing 110 is a housing of a tablet PC, and the second housing 170 is a holder which may be rotatable relative to the tablet PC and is configured to support the tablet PC. Certainly, types of the portable electronic device 100 are not limited thereto. In other embodiments, the portable electronic device 100 may also be a notebook, and the first housing 110 and the second housing 170 may be the upper housing and the lower housing of the notebook.

In the portable electronic device 100 provided by the embodiment, the hinge structure 120 may be secured to the first housing 110 with no screws; moreover, a volume of the hinge structure 120 is relatively small, such that much space in the first housing 110 is saved. In addition, in the embodiment, a torque value of the hinge structure 120 of the portable electronic device 100 may be adjusted easily, and detailed description is as follows.

Figure 2:
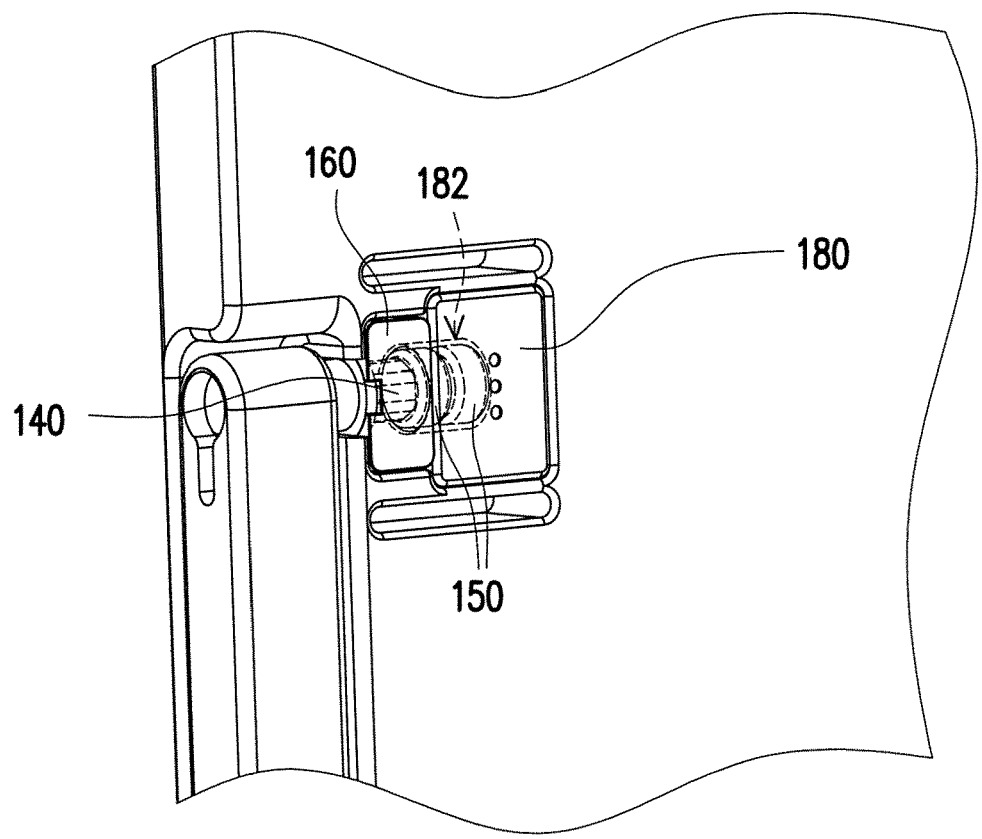
FIG. 2 is a partially enlarged view of FIG. 1.
Figure 3:
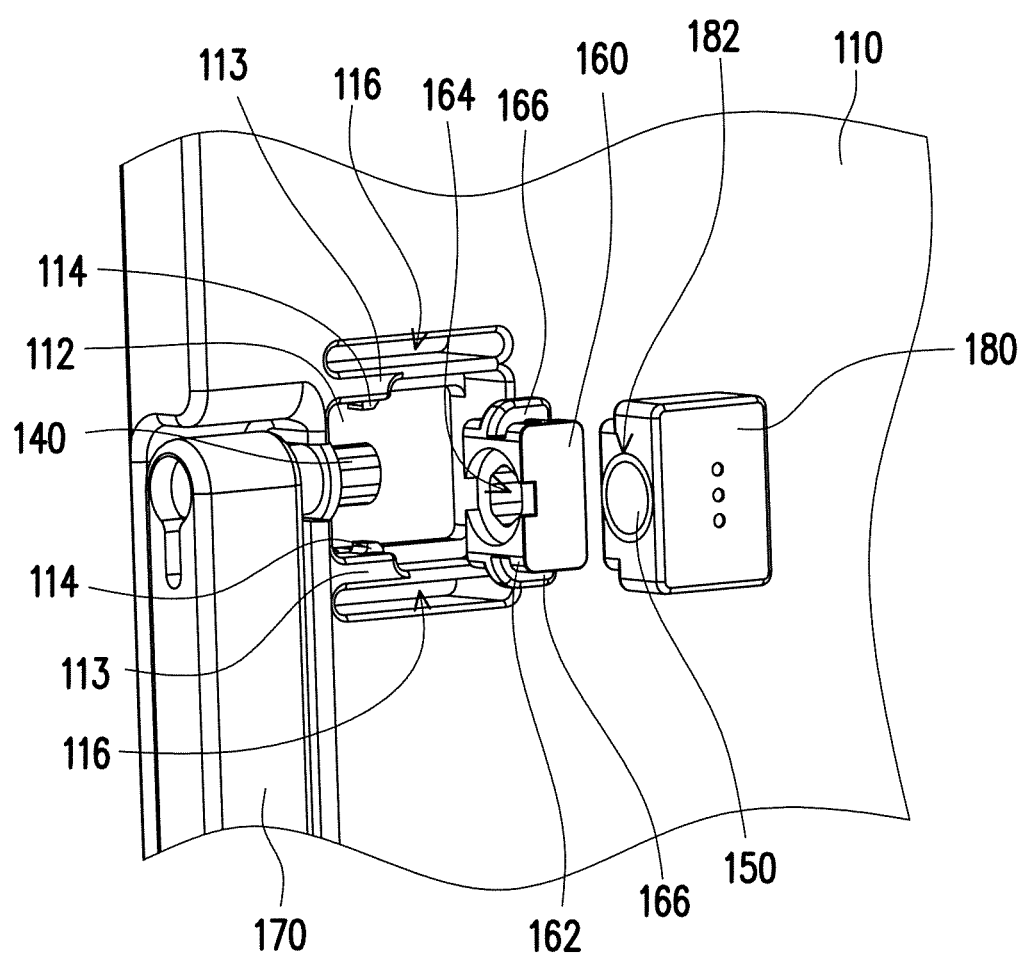
FIG. 3 is a schematic view of FIG. 2 in which a cover body is moved away.
Figure 4:
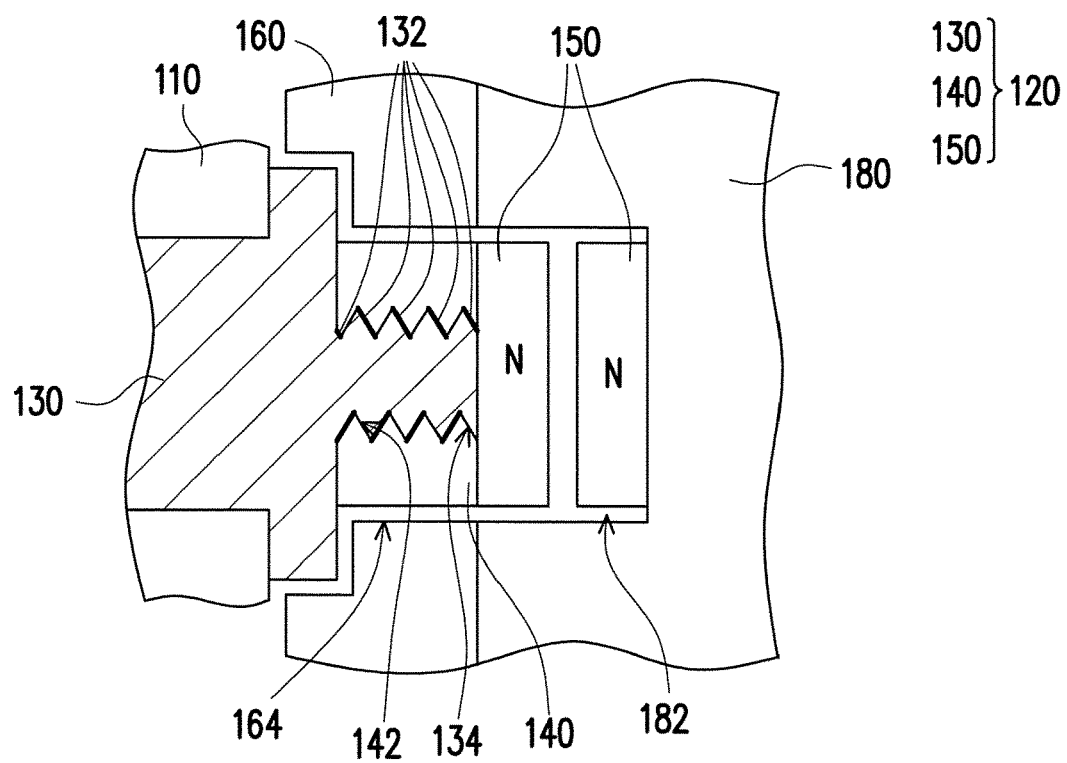
FIG. 4 is a local cross-sectional view of FIG. 2.

FIG. 2 is a partially enlarged view of FIG. 1. FIG. 3 is a schematic view of FIG. 2 in which the cover body 160 and the shell body 180 are moved away. FIG. 4 is a local cross-sectional view of FIG. 2. Referring to FIG. 2 to FIG. 4, the first housing 110 includes a containing groove 112 (shown in FIG. 3) recessed on a surface. As shown in FIG. 4, the hinge structure 120 includes an axis body 130, a torque member 140, and a pressing assembly 150. The axis body 130 is secured to the second housing 170, and the torque member 140 and the pressing assembly 150 are located in the containing groove 112. As shown in FIG. 2, the cover body 160 and the shell body 180 are respectively secured to the first housing 110 and located in the containing groove 112. The cover body 160 includes a chamber body 164 configured to accommodate the torque member 140. Cross sections of the torque member 140 and the chamber body 164 transverse to a central axis of the axis body 130 are non-circular cross sections, for example, polygonal cross sections in the embodiment, opposite to each other. In other words, an outer contour of the torque member 140 is shaped as a polygonal column, such that the cover body 160 may lean against the outer contour of the torque member 140, and that the torque member 140 is disabled from being rotatable relative to the cover body 160 around the central axis of the axis body 130.

The shell body 180 includes a chamber body 182 configured to accommodate the pressing assembly 150 and leaning against a side of the cover body 160, so as to prevent the cover body 160 from moving randomly in the containing groove 112. In other embodiments, the cover body 160 and the shell body 180 may be integrated into one body to accommodate the torque member 140 and the pressing assembly 150 together and to be equipped with a chamber body to secure the torque member 140.

In addition, in the embodiment, the first housing 110 includes a first engagement member 114, and the first engagement member 114 protrudes inwardly facing the containing groove 112. Moreover, the first housing 110 has an opening groove 116 (shown is FIG. 3) located at a position close and next to the first engagement member 114 outside the containing groove 112, such that the first housing 110 forms a sheet shape between the first engagement member 114 and the opening groove 116. The cover body 160 includes a second engagement member 162 corresponding to the first engagement member 114 to secure the cover body 160 to the first housing 110. In the embodiment, when the cover body 160 is to be secured to the first housing 110, the cover body 160 may be placed from the right side of the containing groove 112 of the first housing 110 as shown in FIG. 3 and then be pushed towards the left side of the containing groove 112 to a predetermined position. The first engagement member 114 of the first housing 110 and the second engagement member 162 of the cover body 160 are respectively equipped with bevels. When the bevel of the first engagement member 114 of the first housing 110 is pushed by the bevel of the second engagement member 162 of the cover body 160, the first engagement member 114 is pressed and may slightly move outward, such that the second engagement member 162 may pass through. As such, the second engagement member 162 can to be moved to the predetermined position and be engaged with the first engagement member 114, and that the cover body 160 is disabled from moving left and right in the assembling direction. The shell body 180 is placed into and secured to the right side of the containing groove 112 as shown in FIG. 3 after the cover body 160 is placed into the containing groove 112, such that the shell body 180 can lean against the cover body 160, and the cover body 160 is further prevented from moving towards the right side of the containing groove 112 as shown in FIG. 3.

In addition, as shown in FIG. 3, the cover body 160 has two protruding parts 166 located on two sides of the cover body 160. The two protruding parts 166 extend to positions below two blocks 113 of the first shell body 110 as shown in FIG. 2 when the cover body 160 is secured to the first housing 110, such that the cover body 160 is kept in the containing groove 112 by the first housing 110.

Back to FIG. 4, in the embodiment, the axis body 130 includes a contact surface 132, and the torque member 140 leans against the contact surface 132 of the axis body 130. The torque member 140 and the axis body 130 are relatively rotatable around the central axis of the axis body 130, and the torque member 140 is pushed by the contact surface 132 to move around the central axis of the axis body 130 when the torque member 140 and the axis body 130 rotate relatively. Specifically, in the embodiment, one end of the axis body 130 has an external thread 134, and the torque member 140 has a first internal thread 142. The torque member 140 is threaded to the axis body 130, and the contact surface 132 of the axis body 130 is located on the surfaces on the external thread 134 facing the pressing assembly 150.

In the embodiment, the pressing assembly 150 includes two magnetic members, the same magnetic properties are provided at respective sides of the magnetic members close to each other, such that the two magnetic members are repulsive with each other. The two magnetic members are placed in the chamber body 182 of the shell body 180 in advance and assembled and located in the containing groove 112 along with the shell body 180 and leans against the torque member 140. When the axis body 130 rotates, the torque member 140 is pushed rightwards. The torque member 140 then pushes the magnetic member on the left of the two magnetic members rightwards, such that the two magnetic members are pushed closer to each other, and that magnetic repulsive force between the magnetic member on the right and the magnetic member on the left increases. The magnetic member on the left then pushes the torque member 140 leftwards; resistance force is thus generated when the torque member 140 moves rightwards or when the axis body 130 rotates. A pressure is then applied to the torque member 140 and the contact surface 132 of the axis body 130, friction between the torque member 140 and the axis body 130 is thus increased, and a predetermined torque value of the hinge structure 120 is therefore generated.

In the embodiment, the pressing assembly 150 is constituted by two magnetic members repulsive with each other, and the torque member 140 is pushed by one of the magnetic member. In other possible embodiments of the invention, the pressing assembly 150 may include only a single magnetic member, and the torque member 140 is magnetic. As the pressing assembly 150 and the torque member 140 are repulsive with each other, a pushing force pushing towards the contact surface 132 may also be provided by the pressing assembly 150 to the torque member 140 to obtain similar usage effect.

It is worth noting that in the embodiment as shown in FIG. 4, a torque force of the hinge structure 120 depends on the degree of the torque member 140 pressed on the contact surface 132 of the axis body 130, and such force is generated from the degree of the pressing assembly 150 (i.e., the magnetic member on the left) pressed on the torque member 140. Thereby, if the torque fore is required to be adjusted, only the pressing assembly 150 has to be replaced. For instance, a force of the pressing assembly 150 (i.e., the magnetic member on the left) pressed on the torque member 140 may be changed by selecting the pressing assembly 150 of different magnetic force or adjusting the depth of the space accommodating the pressing assembly 150 in the shell body 180. The torque value may be adjusted conveniently.

Naturally, how the pressing assembly 150 presses the torque member 140 is not limited thereto. In other embodiments, the pressing assembly 150 may also be a tubular or columnar shape elastic member, such as a tubular rubber or a compression spring, and is in contact with the torque member 140 to provide the pushing force. Similar usage effect is thus obtained. In addition, in another possible embodiment of the invention, if the cover body 160 and the shell body 180 are to be integrated to form a cover body of a single assembly, the elastic member may be directly accommodated in a chamber body of the integrated cover body. As such, an end of the elastic member leans against a wall surface of the chamber of the cover body, and the other end leans against the torque member 140. Similar usage effect is thus obtained.

Besides, as shown in FIG. 4, the pressing assembly 150 in the embodiment is located on the right side of the torque member 140, and the torque member 140 is located between the axis body 130 and the pressing assembly 150. In other possible embodiments of the invention, the pressing assembly 150 may be changed and manufactured as a round tubular shape, and the pressing assembly 150 shaped as a round tubular may be sleeved around the axis body 130, such that the pressing assembly 150 is located between the axis body 130 and the torque member 140. An end of the pressing assembly 150 leans against the torque member 140, and the other end leans against the axis body 130. Threads of the axis body 130 and the torque member 140 are placed upside down. When the axis body 130 and the torque member 140 rotates relatively, the torque member 140 moves towards the axis body 130 and presses the pressing assembly 150. A pushing force is provided to the torque member 140 by the pressing assembly 150, such that the torque member 140 is pushed towards the contact surface 132 on the thread of the axis body 130. Thereby, similar usage effect is obtained.

Through such arrangement, in the portable electronic device 100 provided by the embodiment, when the second housing 170 rotates relative to the first housing 110, the axis body 130 rotates along with the second housing 170. The cover body 160 leans against the torque member 140, as such the torque member 140 is disabled from being rotatable relative to the first housing 110, and that the axis body 130 rotates relative to the torque member 140. The torque member 140 is pushed by the contact surface 132 of the axis body 130 towards the right side of FIG. 4, such that the pressing assembly 150 on the right is pressed by the torque member 140, and that the pressing assembly 150 is compressed and part of the force is stored as potential energy. The torque member 140 is pushed back by the pressing assembly 150 as affected by magnetic repulsive force, and that the contact surface 132 of the axis body 130 is pushed leftwards by the torque member 140. An applied force between the torque member 140 and the contact surface 132 is increased, and friction between the axis body 130 and the torque member 140 is therefore increased. Friction between the torque member 140 and the contact surface 132 of the axis body 130 acts as the torque force to drive the axis body 130 to rotate relative to the torque member 140, such that sufficient torque value is provided between the axis body 130 and the torque member 140. When the tablet PC is places on a table, the hinge structure 120 has sufficient torque value to enable the holder to support the tablet PC.

The following provides other types of hinge structures and other ways to dispose the hinge structures and the first housing. In the following embodiments, elements identical or similar to the previous embodiment are denoted by the same or similar reference numerals, only differences among different embodiments are described, and similar content will not be described again hereinafter.

Figure 5:
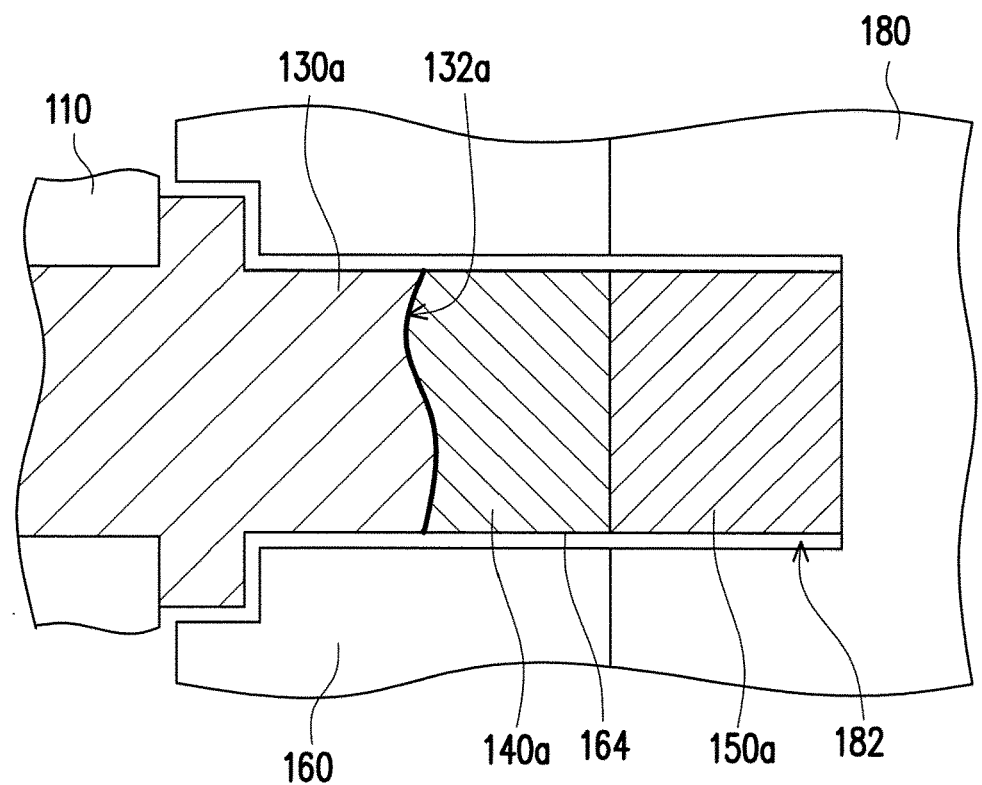
FIG. 5 and FIG. 6 are respectively local cross-sectional views of hinge structures according to other embodiments of the invention.
Figure 6:
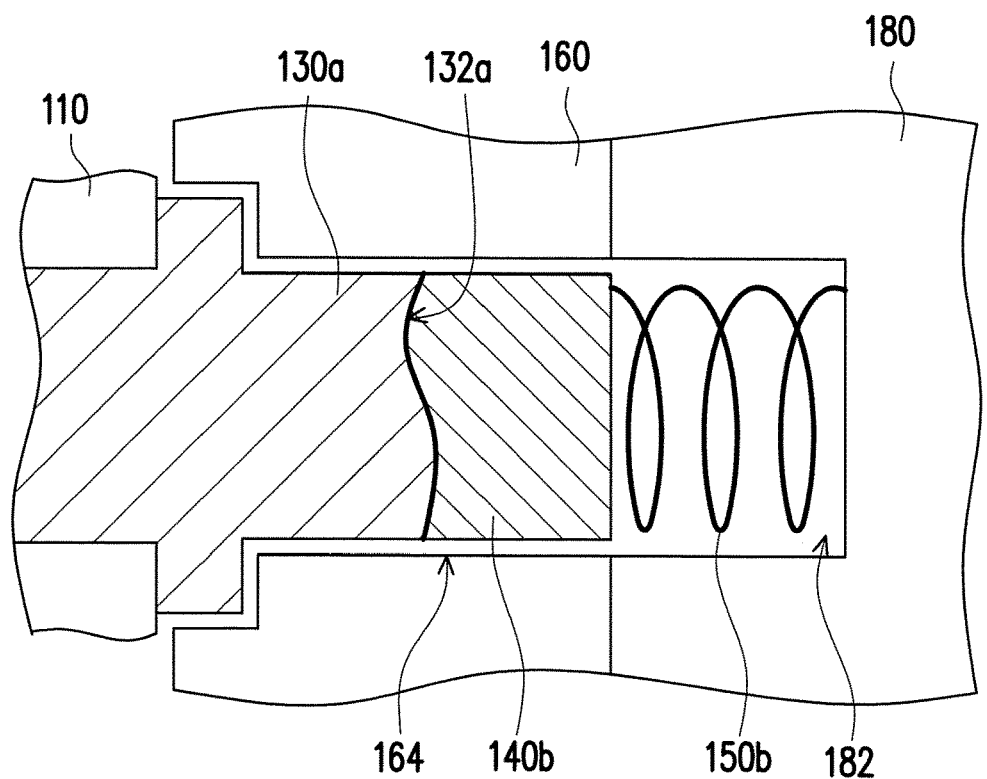

FIG. 5 and FIG. 6 are respectively local cross-sectional views of hinge structures according to other embodiments of the invention. Referring to FIG. 5, differences between a hinge structure in FIG. 5 and the hinge structure 120 in FIG. 4 include that positions and formations of a contact surface 132a and the contact surface 132 are different. Specifically, in FIG. 4, the torque member 140 is threaded to the axis body 130, such that the contact surface 132 between the pushed torque member 140 and the axis body 130 is a surface of the external thread 134 of the axis body 130 facing the pressing assembly 150. In the embodiment as shown in FIG. 5, the contact surface 132a is located at an end of an axis body 132a, and the contact surface 132a includes an eccentric concave surface and an eccentric convex surface. The word "eccentric" refers to the fact that the location between the concave surface and the convex surface is deviated from a center of the axis body 130a viewing in a direction along the central axis from one side of a central axis of the axis body 130a (i.e., observing the axis body 130a from the right side to the left side in FIG. 5). A contour of an end surface of a torque member 140a is shaped to be fitted into a contour of the contact surface 132a of the axis body 130a. The end surface of the torque member 140a is in contact with the contact surface 132a of the axis body 130. As the concave surface and the convex surface are deviated from the center of the axis body 130a, when the axis body 130a and the torque member 140a rotate relatively, the torque member 140a is pushed by the convex surface of the axis body 130a and is thus moved rightwards. Thereby, usage effect similar to above embodiments is obtained.

Furthermore, the pressing assembly 150 and a pressing assembly 150a are different in forms. In the embodiment, the pressing assembly 150a is a single element with a size close to the chamber body 182 of the shell body 180, and that the pressing assembly 150a may be pressed by a bottom wall surface of the chamber body 182. In the embodiment, the pressing assembly 150a is, for example, rubber and may be slightly elastic and flexible. As a contour of the contact surface 132a is asymmetric to the central axis, when the axis body 130a rotates, the torque member 140a is pushed by the contact surface 132a of the axis body 130a and moved towards a direction of the pressing assembly 150a (right side of FIG. 5). As the pressing assembly 150a is pressed by the bottom wall surface of the chamber body 182, a pushing force (reaction force) is provided by the pressed pressing assembly 150a to the torque member 140a, such that the torque member 140a is pushed leftwards and is pressed on the contact surface 132a of the axis body 130a. Friction between the torque member 140a and the contact surface 132a of the axis body 130a is served as the torque force driving the axis body 130a to rotate.

Thereby, if the torque force is to be adjusted, the pressing assembly 150a with different length or different hardness may be adopted, such that, when the pressing assembly 150a is pushed and pressed by the torque member 140a, degree of the reaction force provided to the torque member 140a may be different, and that the torque force of the hinge structure is changed.

It is worth mentioning that the contact surfaces 132 and 132a are not limited to the above forms. As long as the contact surfaces 132 and 132a are eccentric concave surfaces, eccentric convex surfaces, irregular curved surfaces, bevels or spiral end surfaces, when the axis bodies 130 and 130a rotate, the torque members 140 and 140a may be pushed rightwards.

Referring to FIG. 6, differences between a hinge structure in FIG. 6 and the hinge structure in FIG. 5 include that forms of the pressing assembly 150a and a pressing assembly 150b are different. In FIG. 6, the pressing assembly 150b is an elastic member, for example, a compression spring. An end of the elastic member leans against the bottom wall surface of the chamber body 182, and the other end leans against the torque member 140b, and thereby, usage effect similar to the embodiment illustrated in FIG. 5 is provided.

Figure 7:
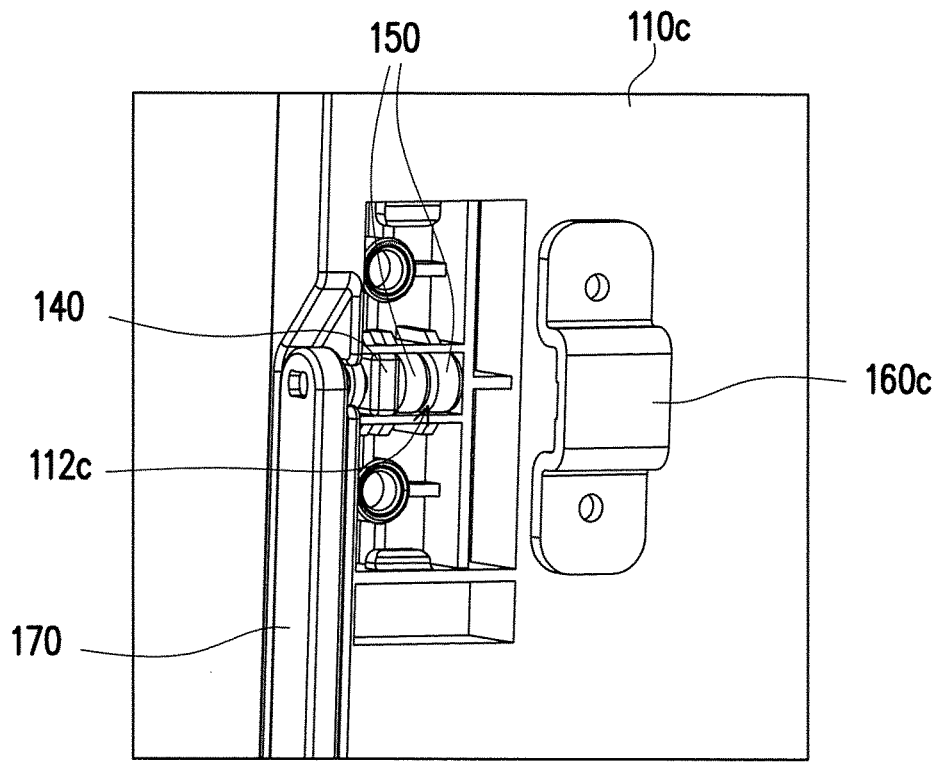
FIG. 7 is a local schematic view of a portable electronic device in which a cover body is moved away according to another embodiment of the invention.

FIG. 7 is a local schematic view of a portable electronic device in which a cover body is moved away according to another embodiment of the invention. Referring to FIG. 7, differences between a portable electronic device in FIG. 7 and the portable electronic device 100 in FIG. 3 include that in the embodiment, an inner contour of a containing groove 112c of the first housing 110 is shaped to be fitted into the outer contour of the torque member 140, such that the first housing may lean against the outer contour of the torque member 140. A cross section of the torque member 140 may be shaped as a polygon, for example, a square in the embodiment. The inner contour of the containing groove 112c of the first housing 110 may be shaped as a corresponding polygonal groove. When the torque member 140 is placed into the containing groove 112c, the torque member 140 is restricted by an inner wall of the containing groove 112c, and that the torque member 140 is disabled from being rotatable relative to the first housing 110. In the embodiment, a cover body 160c may be secured to the first housing 110 through screws and covers the containing groove 112, such that the torque member 140 and the pressing assemblies 150 are masked, and an appearance of the portable electronic device is kept simple.

In the embodiment, the pressing assemblies 150 are located between the torque member 140 and the inner wall of the containing groove 112c. The torque member 140 is driven to move towards the direction of the pressing assemblies 150 and the pressing assemblies 150 are thus pushed and pressed when the axis body 130 (as shown in FIG. 4) rotates. The torque member 140 is pushed and pressed by the pressing assembly 150 on the left as affected by the magnetic repulsive force between the two pressing assemblies 150, such that the torque member 140 is pressed on the contact surface 132 of the axis body 130 (as shown in FIG. 4), and sufficient torque force is provided between the axis body 130 and the torque member 140. Moreover, as the torque member 140 is restricted by the inner wall of the containing groove 112c; thereby, the torque member 140 is disabled from pivoting relative to the first housing 110 without being secured by screws.

To sum up, in the portable electronic device provided by the embodiments of the invention, the inner contour of the containing groove of the first housing is shaped to be fitted into the outer contour of the torque member of the hinge structure; alternatively, the inner contour of the cover body secured to the first housing is shaped to be fitted into the outer contour of the torque member of the hinge structure, such that the torque member in the containing groove is disabled from being rotatable relative to the first housing. Therefore, the hinge structure is secured to the first housing with no screws, and less space in the first housing is thus allocated to accommodate the hinge structure. In addition, in the hinge structure provided by the embodiments of the invention, the torque member is designed to leans against the contact surface of the axis body and to be located between the axis body and the pressing assembly, such that the torque member is pushed by the contact surface when the axis body rotates and moved towards the direction of the pressing assembly, and a pushing force (possibly be a reaction force, a magnetic force, or an elastic force) is correspondingly provided by the pressing assembly to the torque member, the contact surface of the axis body is thus pushed by the torque member. As the torque value provided by the hinge structure is related to friction between the torque member and the contact surface of the axis body, friction (friction is the product of friction coefficient and normal force) between the torque member and the contact surface of the axis body may be changed through adjusting the size, the degree of magnetic force, the elastic coefficient, etc. of the pressing assembly, and usage effect delivering easy design and easy change of setting parameters is thus provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hinge structure, comprising: an axis body, comprising a contact surface; a torque member, leaning against the contact surface of the axis body, the torque member and the axis body being rotatable relatively around a central axis of the axis body, the contact surface pushing the torque member to move along the central axis of the axis body when the torque member and the axis body being rotatable relatively;
   a first housing, comprising a containing groove recessed on a surface, the torque member and a pressing assembly being located in the containing groove;
   the pressing assembly providing a pushing force from an inner surface of the containing groove to the torque member, the torque member pushing towards the contact surface through the pushing force;
   a cover body, secured to the first housing and located in the containing groove, an inner contour of the cover body is corresponding to an outer contour of the torque member, the inner contour of the cover body leaning against the outer contour of the torque member to disable the torque member from being rotatable around the central axis of the axis body relative to the cover body; and a second housing, the axis body being secured to the second housing.

2. The hinge structure as claimed in claim 1, wherein the axis body has an external thread, the torque member has a first internal thread, the torque member is threaded to the axis body, and the contact surface of the axis body is located on the external thread.

3. The hinge structure as claimed in claim 2, wherein the external thread is located on one end portion of the axis body, and the torque member is located between the pressing assembly and the axis body.

4. The hinge structure as claimed in claim 1, wherein the pressing assembly comprises two magnetic members, the two magnetic members are repulsive with each other, and one of the magnetic members leans against the torque member to provide the pushing force.

5. The hinge structure as claimed in claim 1, wherein the torque member and the pressing assembly are both magnetic, and the torque member and the pressing assembly are repulsive with each other.

6. The portable electronic device as claimed in claim 1, wherein a cross section of the torque member transverse to the central axis of the axis body is a non-circular cross section.

* * * * *